Dec. 11, 1934.  C. A. MASTERMAN  1,983,629
VALVE FOR CONTROLLING AND/OR REGULATING THE FLOW OF FLUID
Filed Feb. 13, 1932  2 Sheets-Sheet 1

INVENTOR
C. A. MASTERMAN
BY
ATTORNEY

Dec. 11, 1934.  C. A. MASTERMAN  1,983,629
VALVE FOR CONTROLLING AND/OR REGULATING THE FLOW OF FLUID
Filed Feb. 13, 1932  2 Sheets-Sheet 2
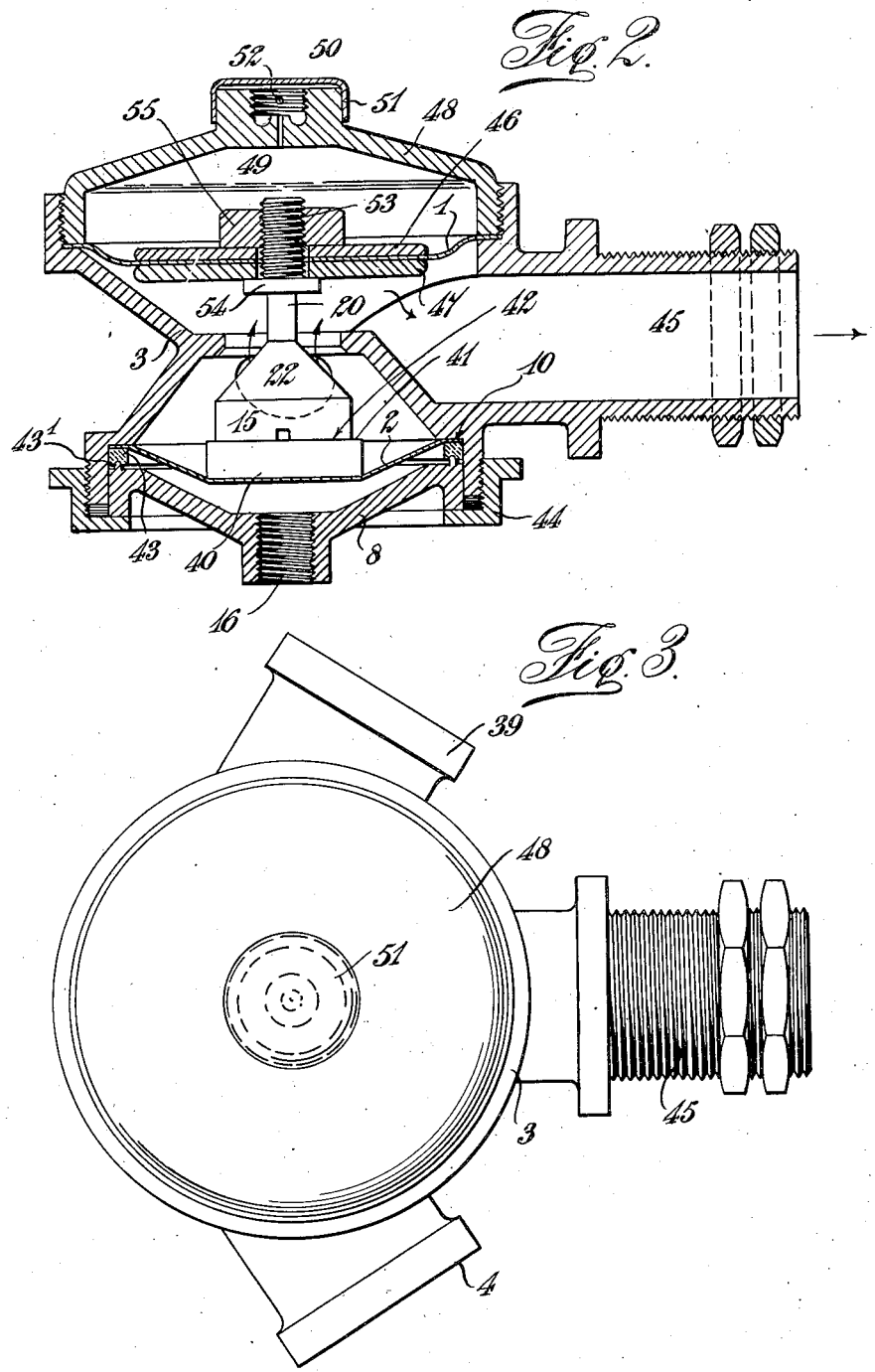
INVENTOR
C. A. MASTERMAN
BY
ATTORNEY Patented Dec. 11, 1934

1,983,629

UNITED STATES PATENT OFFICE 1,983,629

VALVE FOR CONTROLLING AND/OR REGULATING THE FLOW OF FLUID

Cyril Aubyn Masterman, Westminster, England, assignor to The Gas Light and Coke Company, London, England, a British company Application February 13, 1932, Serial No. 592,792
In Great Britain March 9, 1931

2 Claims. (Cl. 236—25)

This invention relates to valves for controlling and/or regulating the flow of a fluid and is more particularly intended for use in controlling and/or regulating the supply of gas and water to a water heating apparatus such as a geyser and the invention as applied to a geyser or other like water heating apparatus has for its object to provide an improved valve for controlling and/or regulating the flow of gas and/or water to the geyser or water heating apparatus in such manner as to prevent gas flowing thereto until the water is being supplied to the geyser or apparatus in sufficient quantity. The valve may also be adapted to act as a pressure governor.

According to the present invention a fluid controlling and/or regulating supply valve is provided with two superposed diaphragms the upper diaphragm being actuated by the fluid and/or by the movement of the lower diaphragm and the latter being actuated as the result of a reduction or increase in the pressure of water which is being supplied to a water heating apparatus such as a geyser. The valve aforesaid may be used in combination with an ejector having an inlet for the supply of water thereto and an opening for the connection of the said ejector device to the space below the lower diaphragm in the said valve.

In order that the invention may be clearly understood and readily carried into effect reference is made to the accompanying drawings which show diagrammatically and by way of example constructions of controlling and/or regulating fluid supply valves in accordance with the present invention.

Figure 2 is a modified form of valve in accordance with the present invention.

Figure 3 is a plan of Figure 2.

Figure 1:
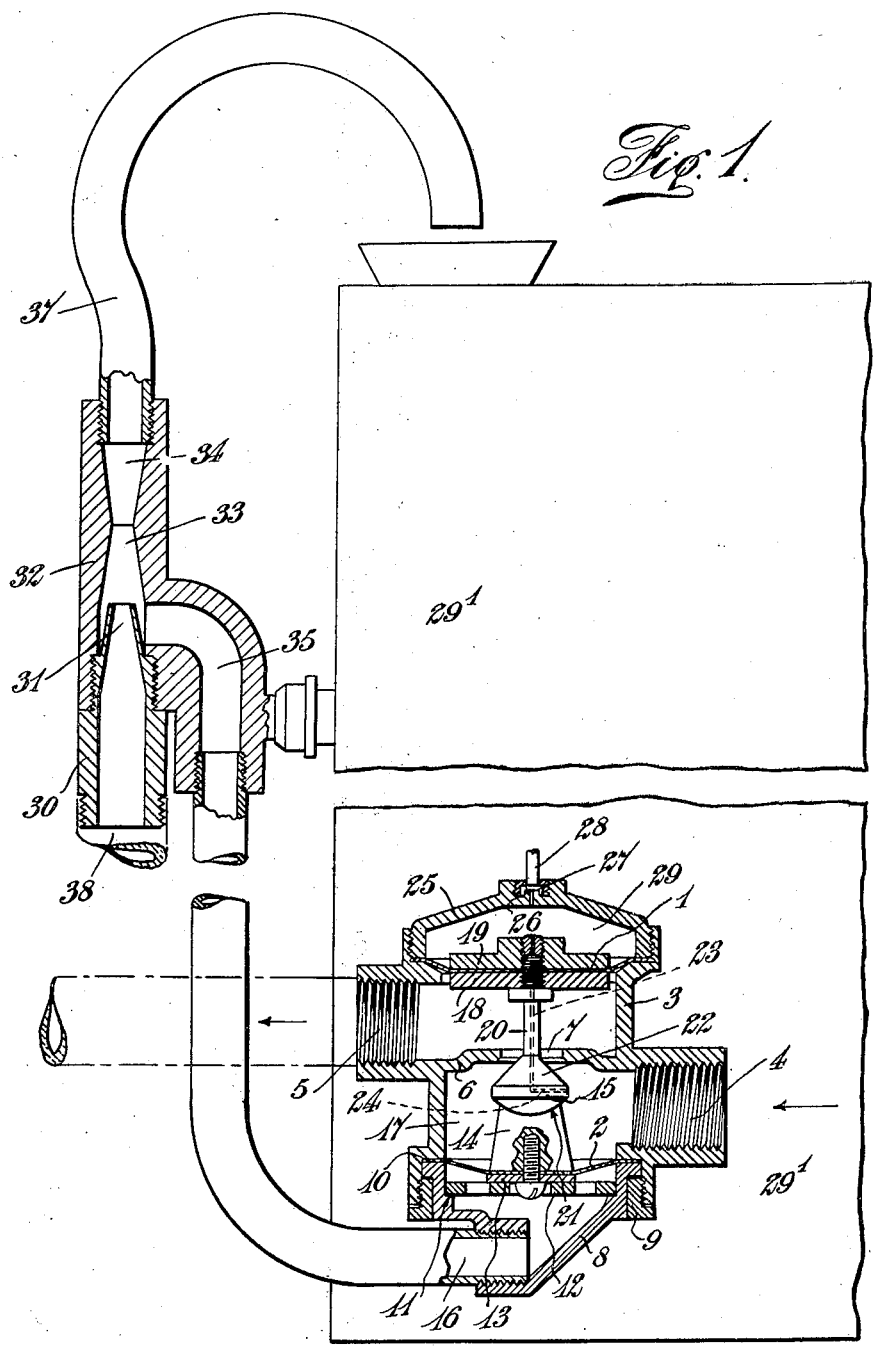
Figure 1 is a vertical section of a fluid controlling and/or regulating supply valve in accordance with the present invention showing also an ejector for controlling the supply of water to a water heating apparatus such as a geyser.

Referring to Figure 1 of the drawings it will be seen therefrom that the valve is provided with two superposed diaphragms 1, 2 the upper diaphragm 1 being actuated by the fluid which in this particular instance is gas and/or by the movement of the lower diaphragm 2 the latter being actuated as the result of a reduction or increase in the pressure of water which is being supplied to a water heating apparatus such as a geyser part only of which is shown. The two diaphragms 1, 2 are mounted in the valve casing 3 of any suitable shape and cross section the said casing being provided with a gas inlet 4 and a gas outlet 5 these two openings being provided in any suitable position on the casing. For convenience of illustration the openings 4 and 5 are shown as being in the same plane. It should be clearly understood however that these two openings are arranged at right angles to each other the opening 5 being in actual practice at right angles to the plane of the paper and projecting rearwardly or backwardly of the plane of the paper so that a ring or other suitable burner can be screwed or suitably attached to the opening 5. The openings 4 and 5 are separated by a partition 6 formed in one with the casing 3 and in the said partition is a central opening 7. The lower end of the casing 3 is adapted to carry an annulus 8 which may be retained in position by a suitable gland such as 9 or cover plate preferably screwed into the casing 3 and at the lower end thereof. The lower diaphragm 2 is clamped between the annulus 8 and a shoulder 10 in the interior of the casing by means of the gland 9. The annulus 8 is shouldered internally as at 11 to which is rigidly but detachably secured a perforated plate 12. Between the lower diaphragm 2 and the perforated plate 12 is disposed a fluid tight washer 13 or a metal plate and on the upper side of the said diaphragm is supported a block 14 the upper end of which forms a seat for a valve 15 the lower end of which may be of arcuate form as shown in Figure 1, or of flat formation as shown in Figure 2. The lower diaphragm 2 is rigidly clamped in position between the fluid tight washer 13 and the block 14 so that the diaphragm the block and the washer form a rigid unit. The lower diaphragm 2 acts to prevent the passage of water from an inlet 16 to the gas space 17 in the interior of the casing 3. The perforated plate 12 is preferably of rubber which may be reinforced with fabric and acts to limit the downward movement of the diaphragm. The upper diaphragm 1 is preferably weighted by a disc 18 disposed on its lower side and another disc 19 superimposed on the top of the diaphragm the two discs 18 and 19 being clamped together on the valve stem 20. The lower end of the valve stem is of arcuate form as shown at 21 and adapted to seat itself on the correspondingly formed upper surface of the block 14 which is supported on the upper side of the lower diaphragm 2. The valve stem 20 is formed with a conical portion 22 adapted to co-act with the central opening 7 in the partition 6 in the interior of the casing 3 the said partition separating the gas inlet 4 from the gas outlet 5. If desired the valve stem 20 may be provided with a central bore 23 extending lengthwise through the valve stem and the head 15 of the valve stem may be provided with a lateral hole 24 in communication with the central bore 23 in the valve stem and with the gas inlet 4. The upper end of the casing is closed by an annulus 25 having a small hole 26 and is closed by a plug 27 carrying a pipe 28 which is in communication with the space above the upper diaphragm 1 through the perforation 26. Alternatively the pipe 28 may be directly attached to or screwed into the upper end of the annulus 25 so that in each arrangement gas can flow from the space 17 through the by-pass hole 24 in the valve stem head 15 thence through the central bore 23 in the valve stem 20 and from thence to the space 29 above the upper diaphragm 1. From thence the gas can flow through the pipe 28 to the geyser so as to give a pilot jet. If the lateral opening 24 and the central bore 23 be omitted as may be found convenient in some constructions then the annulus 25 is provided with an air hole and the upper end of the annulus may be closed by a cap as shown in Figure 2 the said cap being secured to the annulus by a split pin passing through the cap and the annulus as shown in Figure 2. The valve hereinbefore described is preferably though not essentially combined with an ejector for controlling the supply of water to a water heating apparatus such as a geyser 29'. Such an arrangement is shown in Figure 1. In this arrangement the ejector comprises a tube 30 provided with an internal nozzle 31 which is screwed into a tubular member 32 having a restricted passage 33 directly above the nozzle 31 the restricted passage 33 thereafter widening as at 34 towards the upper end of the tubular member 32 carrying the nozzle 31 so as to form an ejector. Adjacent to the nozzle 31 is a branch passage 35 which is connected by a pipe 36 to the opening 16 below the lower diaphragm 2. The ejector above described may be connected to the water heating apparatus such as a geyser by any suitable means as for example by the pipe 37. 38 is the water inlet pipe to the ejector.

In the modified form of valve shown in Figure 2 the construction of the valve is somewhat similar to the construction shown in Figure 1. In the arrangement shown in Figure 2 similar parts are indicated by like reference numerals. In this arrangement the casing 3 is provided with two gas inlets 4 and 39 either of which may be used depending entirely on whether the valve is a right hand valve or a left hand valve. Obviously the valve shown in Figure 1 may also be provided with two gas inlets depending on whether the valve is to be used as a right hand or a left hand valve. In Figure 2 the lower diaphragm 2 which is preferably of rubber is attached to a disc 40 of hard rubber on the upper surface of which is a metal cover plate 41 which prevents the said disc 40 sticking to the flat face 42 of the valve 15. The diaphragm 2 is preferably reinforced with fabric of any suitable nature so as to limit the stretching movement of the said diaphragm. The lower diaphragm 2 is provided with a marginal ring 43 preferably of hard rubber which is clamped between an upwardly projecting ridge 43' on the annulus 8 and the shoulder 10 on the interior of the casing 3. The annulus 8 is retained in position by an internally screw threaded cover 44. As before 16 is the water inlet from the pipe 36 connected to the ejector shown in Figure 1. 45 is the gas outlet to the geyser burner. The upper diaphragm 1 which is preferably of leather, animal skin or other suitable material is clamped between two brass discs 46, 47 and the upper end of the casing 3 is closed by an externally screw threaded annulus 48 which screws into the correspondingly screw threaded portion of the casing 3. The annulus is provided with an air vent 49 communicating with a recess 50 and with the atmosphere. The recess 50 is screw threaded to receive a plug to prevent gas leakage should the upper diaphragm be ruptured. The annulus 48 may be closed by a cap 51 which may be held in position by a split pin 52 passing through the cap 51 and the upper end of the annulus 48. The discs 46 and 47 are loosely mounted on the externally screw threaded part 53 of the valve stem 20 and abut against the shoulder 54 thereon. 55 is a nut which clamps the brass discs 46, 47 with a diaphragm interposed therebetween in position on the valve stem.

In operation and assuming the apparatus is inoperative then the water fills up the branch passage 36 in the ejector and the space below the lower diaphragm which is thus caused to bulge upwardly and thus close the opening in the partition in the valve casing so that gas cannot pass through the said opening to the geyser. When however the water is turned on the flow of water through the ejector creates a reduced pressure in the branch passage thereof and in the space below the lower diaphragm 2 so that when sufficient quantity of water is flowing to the geyser or other water heating apparatus the lower diaphragm falls and the valve 15 consequently falls from its seat thus permitting the flow of gas from the inlet 4 in the valve casing 3 to the outlet 5 therefrom, the pressure of the gas being controlled by the upper diaphragm. Meantime however gas is flowing through the by-pass 24 in the valve head 15 and the bore 23 in the valve stem 20 and the pilot jet pipe 28 leading from the annulus 25 at the upper end of the valve casing 3 to the water heating apparatus 29' so that the gas flowing to the geyser 29' becomes ignited by the flame at the end of the pilot jet pipe. It is obvious however that a full or normal supply of gas to the water heating apparatus cannot take place until a sufficient quantity of water is flowing into the water heating apparatus. When the water heating apparatus is out of use the flow of water through the ejector is stopped and the water consequently fills up the branch passage 36 the space below the lower diaphragm 2 and as a result the latter is raised and closes the valve 15 and thus prevents the flow of gas through the casing to the water heating apparatus. The block 14 on the upper side of the diaphragm 2 when in contact with the arcuate surface 21 of the valve stem 20 acts to prevent the flow of gas through the bore in the valve stem to the space above the upper diaphragm 1 and consequently no gas can pass therefrom through the pilot jet pipe to the water heating apparatus. When however the arcuate head of the valve stem is clear of the aforesaid block a supply of gas flows through the bore sufficient to give a full sized flame at the end of the pilot jet tube or pipe.

What I claim is:—

1. A fluid supply controlling and regulating appliance for governing the flow of a heating medium for heating a liquid, said appliance including a casing having an inlet thereto and an outlet therefrom for the heating medium, a valve within the casing for controlling the flow of the heating medium therethrough, a diaphragm carrying the valve and responsive to the pressure of the heating medium for controlling the valve, a second diaphragm for controlling the valve, and means whereby the flow of the liquid to be heated is utilized to control said second diaphragm.

2. A fluid supply controlling and regulating appliance for governing the flow of a heating medium for heating a liquid, said appliance including a casing having an inlet thereto and an outlet therefrom for the heating medium, a valve within the casing for controlling the flow of the heating medium therethrough, a diaphragm carrying the valve and responsive to the pressure of the heating medium for controlling the valve, a second diaphragm for controlling the valve, and means whereby the flow of the liquid to be heated is utilized to control said second diaphragm, said last named means including a pipe for the flow of the liquid to be heated, a by-pass from the pipe leading to a space below the second diaphragm, and an injector in the pipe to reduce the pressure in the by-pass under flow of the liquid in the pipe.

CYRIL AUBYN MASTERMAN.